(12) United States Patent  
Schneider

(10) Patent No.: US 6,250,791 B1  
(45) Date of Patent: Jun. 26, 2001

(54) LINER AND PIN ASSEMBLY FOR USE WITH AN APPARATUS FOR KNEADING OR MIXING MATERIALS

(76) Inventor: Loren T. Schneider, 19828 Irongate Ct., Northville, MI (US) 48167

( * ) Notice: Subject to any disclaimer, the term of this patent is extended or adjusted under 35 U.S.C. 154(b) by 0 days.

(21) Appl. No.: 09/595,319

(22) Filed: Jun. 16, 2000

(51) Int. Cl.$^7$ ...................................................... B29B 7/80
(52) U.S. Cl. ...................................................................... 366/80
(58) Field of Search ........................... 366/79, 80, 83–85, 366/88–90, 322–324; 425/204, 208, 209

(56) References Cited

U.S. PATENT DOCUMENTS

| | | | |
|---|---|---|---|
| 3,458,894 | * | 8/1969 | Wheeler . |
| 3,590,429 | * | 7/1971 | Bammert et al. . |
| 3,804,382 | * | 4/1974 | Pultz . |
| 3,900,188 | * | 8/1975 | Seufert ................................ 425/208 |
| 3,910,316 | * | 10/1975 | Reifenhauser . |
| 4,028,027 | * | 6/1977 | Worz .................................. 425/204 |
| 4,036,540 | * | 7/1977 | Seufert . |
| 4,089,510 | * | 5/1978 | Picard et al. ........................... 366/83 |
| 4,117,583 | * | 10/1978 | Gnadig et al. ....................... 425/208 |
| 4,133,460 | * | 1/1979 | Jerpbak ................................. 366/79 |
| 4,361,081 | * | 11/1982 | Howard ................................ 366/88 |
| 4,364,664 | * | 12/1982 | Theysohn .............................. 366/84 |
| 4,385,876 | * | 5/1983 | Scherping et al. .................. 425/204 |
| 4,462,692 | * | 7/1984 | Meyer .................................. 366/89 |
| 4,519,713 | * | 5/1985 | Godsey et al. ....................... 366/79 |
| 4,590,033 | * | 5/1986 | Chapet . |
| 4,640,672 | * | 2/1987 | Ellwood ............................... 366/79 |
| 4,702,695 | * | 10/1987 | Blach ................................... 366/83 |
| 4,723,901 | * | 2/1988 | Sarumaru ............................ 425/208 |
| 4,746,220 | * | 5/1988 | Sukai et al. .......................... 366/79 |
| 4,960,328 | * | 10/1990 | Schumacher et al. ............... 366/80 |
| 5,110,284 | * | 5/1992 | Dienst et al. ......................... 366/83 |
| 5,116,135 | * | 5/1992 | Kaiser et al. ........................ 366/84 |
| 5,156,860 | * | 10/1992 | Kojima et al. ....................... 366/79 |
| 5,209,937 | * | 5/1993 | Kangas ................................. 366/84 |
| 5,302,019 | * | 4/1994 | Henschel et al. .................... 366/80 |
| 5,352,539 | * | 10/1994 | Psiuk ................................... 366/84 |
| 5,752,770 | * | 5/1998 | Kawaguchi et al. ................ 366/85 |
| 5,816,699 | * | 10/1998 | Keith et al. .......................... 366/84 |

FOREIGN PATENT DOCUMENTS

| | | | |
|---|---|---|---|
| 2632892 | * | 12/1989 | (FR) ..................................... 366/85 |
| 2099320 | * | 12/1982 | (GB) ..................................... 366/85 |
| 98/22274 | * | 5/1998 | (WO) .................................... 366/84 |

* cited by examiner

*Primary Examiner*—Charles E. Cooley
(74) *Attorney, Agent, or Firm*—Warn, Burgess & Hoffman, PC

(57) ABSTRACT

An apparatus for kneading or mixing materials. The apparatus including a housing having first and second separable housing sections. A cavity in each housing section, the cavities cooperating together to form a mixing chamber when the housing is closed. First and second liners are releasably secured by liner retainers to the respective first and second housing sections. A plurality of kneader pins are secured to the liner sections and cooperate with a kneader screw disposed in the mixing chamber to knead or mix various materials.

14 Claims, 9 Drawing Sheets

LINER AND PIN ASSEMBLY FOR USE WITH AN APPARATUS FOR KNEADING OR MIXING MATERIALS

BACKGROUND OF THE INVENTION

1. Field of the Invention

The present invention relates generally to a kneading or mixing apparatus used to knead, mix or compound polymeric materials and, more specifically, to an apparatus including a liner secured within a kneader housing.

2. Description of the Related Art

Kneaders or mixing machines are typically used to knead, mix or compound a polymeric material. Typically, such machines include a housing that forms a mixing chamber. Inserted into the mixing chamber is a shaft or screw member that both rotates and reciprocates to mix material contained or placed within the mixing, chamber. To aid in the kneading, or mixing, process, a plurality of kneader or mixing, pins extend through the housing, and inwardly into the mixing chamber. The pins cooperate with the screw member through notches in the screw member to further agitate or "work" the polymeric material to complete the mixing or kneading process.

Depending, upon the type of material sought to be mixed or compounded, the number of kneader pins used may vary. It also is known to vary the length of the pins; i.e., the amount of pin extending into the mixing chamber may also change. Arrangement of the pins is also a factor to be considered regarding the mixing or kneading process. Arrangement of the pins, however, is limited by heating/cooling passages extending through the housing. Further, as the pins extend through the housing, it is possible that the mixture or kneaded material may leak through the kneader pin/housing interface. Finally, changing the kneader pins can be a time-consuming and difficult chore resulting in downtime for the kneader or mixing machine.

The prior art discloses several kneader/extruder assemblies wherein the kneader pins are attached to and supported by a cylindrical sleeve placed within the housing.

SUMMARY OF THE INVENTION

The present invention provides a kneader apparatus including a housing member formed of first and second housing sections, each of the housing sections having a cavity formed therein, the housing sections combining to define a mixing chamber. A kneader screw is mounted for rotational and/or reciprocal movement within the mixing chamber. A liner is secured to the housing chamber. The liner supports a plurality of kneading pins located thereon. The liner is divided into two sections wherein each section is secured to the corresponding housing section by a liner retainer contacting both the liner section and the housing section.

Other features and advantages of the present invention will be readily appreciated as the same becomes better understood after reading the subsequent description taken in conjunction with the accompanying drawings.

DETAILED DESCRIPTION OF THE PREFERRED EMBODIMENT(S)

Figure 1:
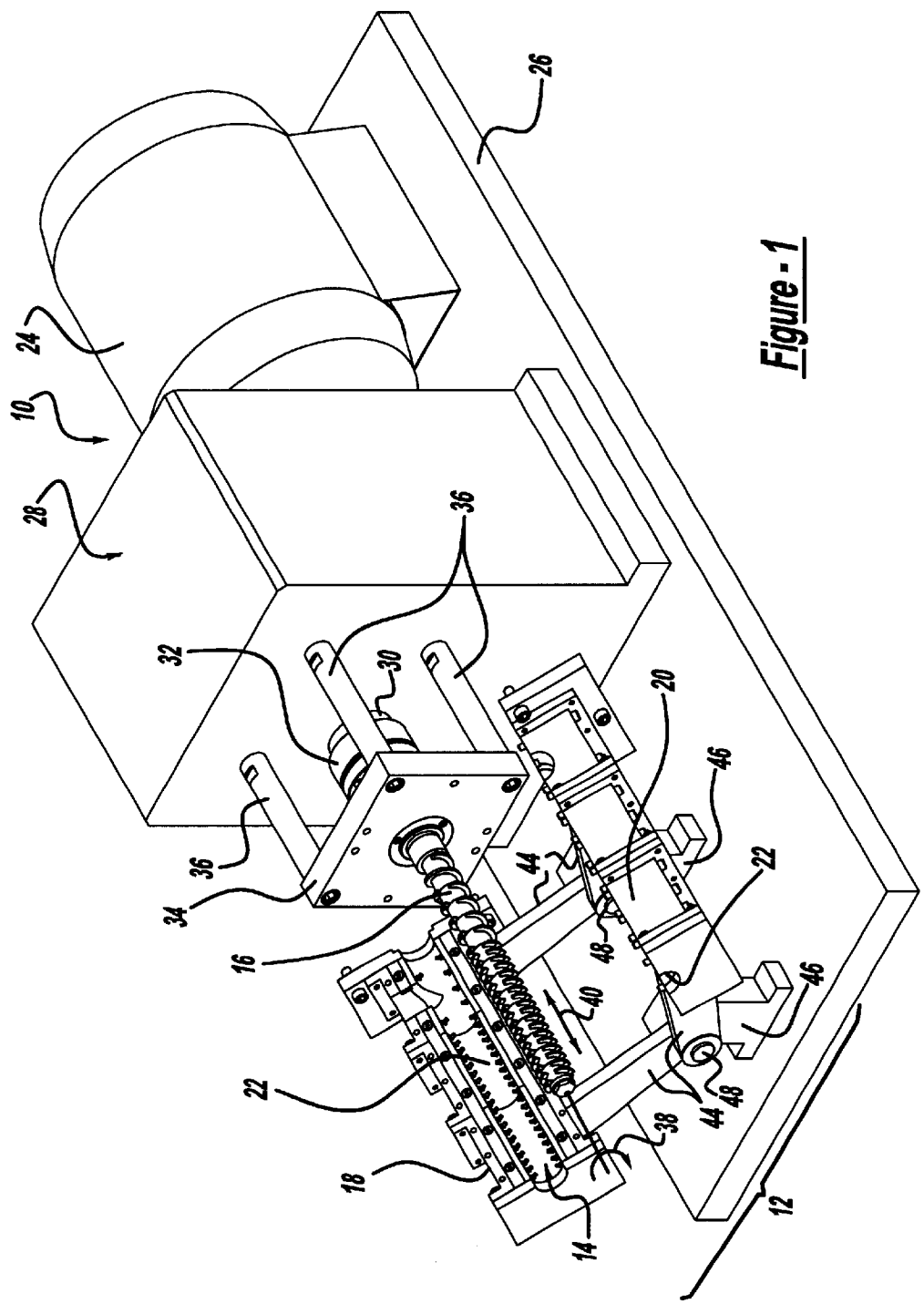
FIG. 1 is a perspective view of a kneader according to the present invention.
Figure 2:
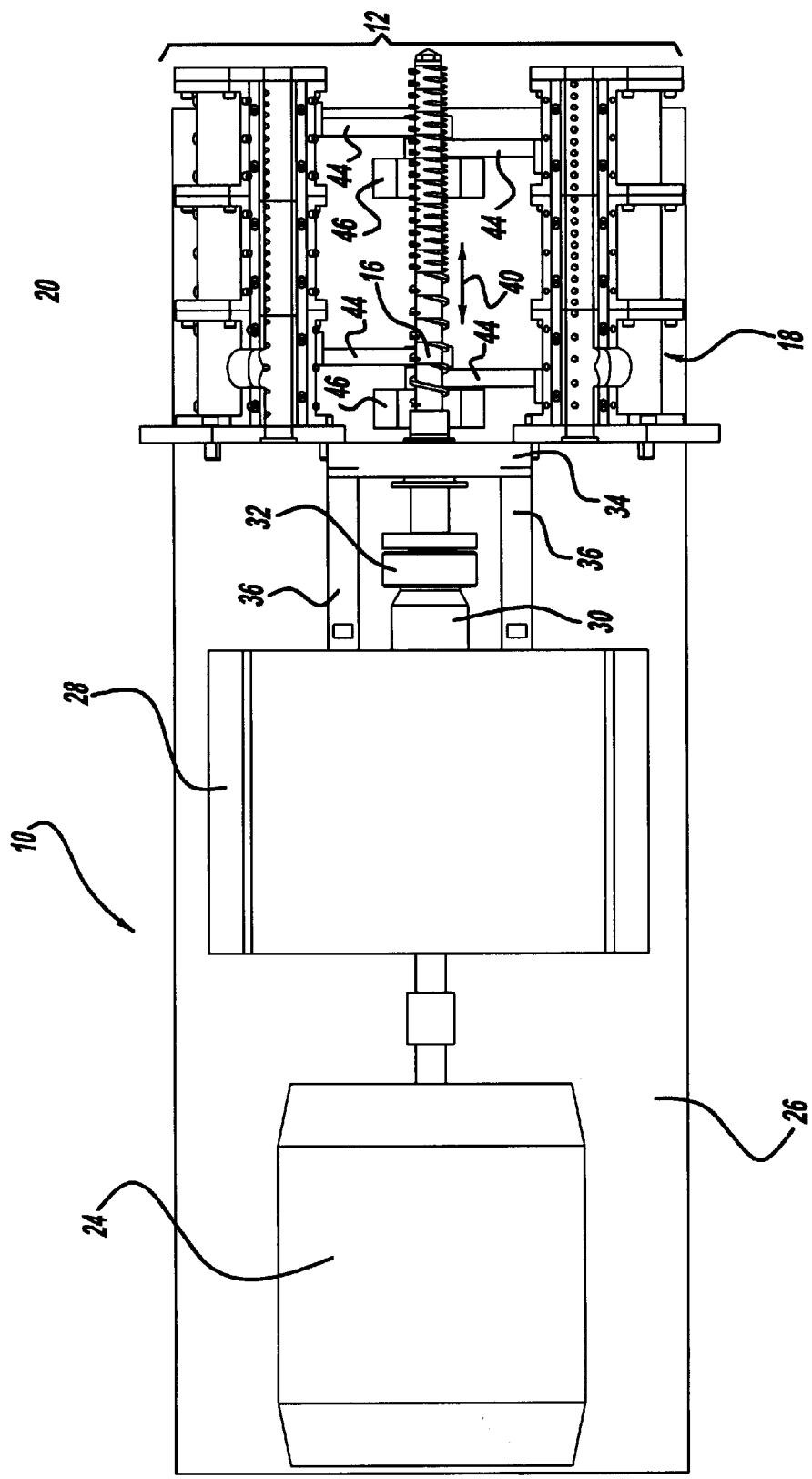
FIG. 2 is a top view of the kneader shown in FIG. 1.

Turning now to FIGS. 1–2, a kneader 10 including a housing 12, defining a mixing chamber 14, and a kneader screw 16 is shown. As is commonly known, the kneader screw 16 is driven such that it moves within the mixing chamber 14 in both a rotary and reciprocal manner. Kneader apparatus' are known that only rotate the kneader screw. The housing 12 is shown in an open position, wherein the respective first and second housing sections or halves 18, 20 are separated from one another. Each of the first and second housing sections 18, 20 has a cavity 22 located therein. It should be understood that when the housing 12 is in a closed position; i.e., the first and second housing sections 18, 20 are secured adjacent one another (see FIG. 4), the cavities 22 in each of the first and second housing sections 18, 20 cooperate together to define the mixing chamber 14. In the preferred embodiment, the cavities 22 have a semi-cylindrical shape. Accordingly, when the first and second housing sections 18, 20 are placed in the closed position, the mixing chamber 14 is cylindrical. The terms "kneader," "extruder" or "mixer" refer to any rotary/reciprocating shaft mixer used to knead, extrude, mix or compound various materials including polymeric materials.

The kneader 10 includes a motor 24 secured to a base 26. A gearbox 28 also secured on the base 26 receives a rotary input from the motor 24 and generates a rotary and reciprocal output at an output shaft 30. A coupling 32 connects the kneader screw 16 to the output shaft 30 of the gearbox 28. It follows that the output shaft 30 drives the kneader screw 16 in a rotary (see arrow 38) and reciprocal (see arrow 40) manner. The kneader screw 16 is supported for rotational motion and reciprocal motion by a support plate 34 secured, by support bars 36, to the gearbox 28.

The housing 12 is also secured to the base 26. As shown in FIGS. 1–2, arms 44 are connected to each of the first and second housing sections 18, 20 of the housing 12. Posts 46 are attached to the base 26. Pivot pins 48 pivotally connect and support the arms 44 on the posts 46. Accordingly, the respective first and second housing sections 18, 20 of the housing 12 separate to open the housing 12 and allow access to the mixing chamber 14. When the housing 12 is closed, threaded fasteners 49 extend through the second housing section 20 and are threadably received in threaded bores 50 on the first housing section 18. The threaded fasteners 49 maintain the housing 12 in a closed position.

Figure 3:
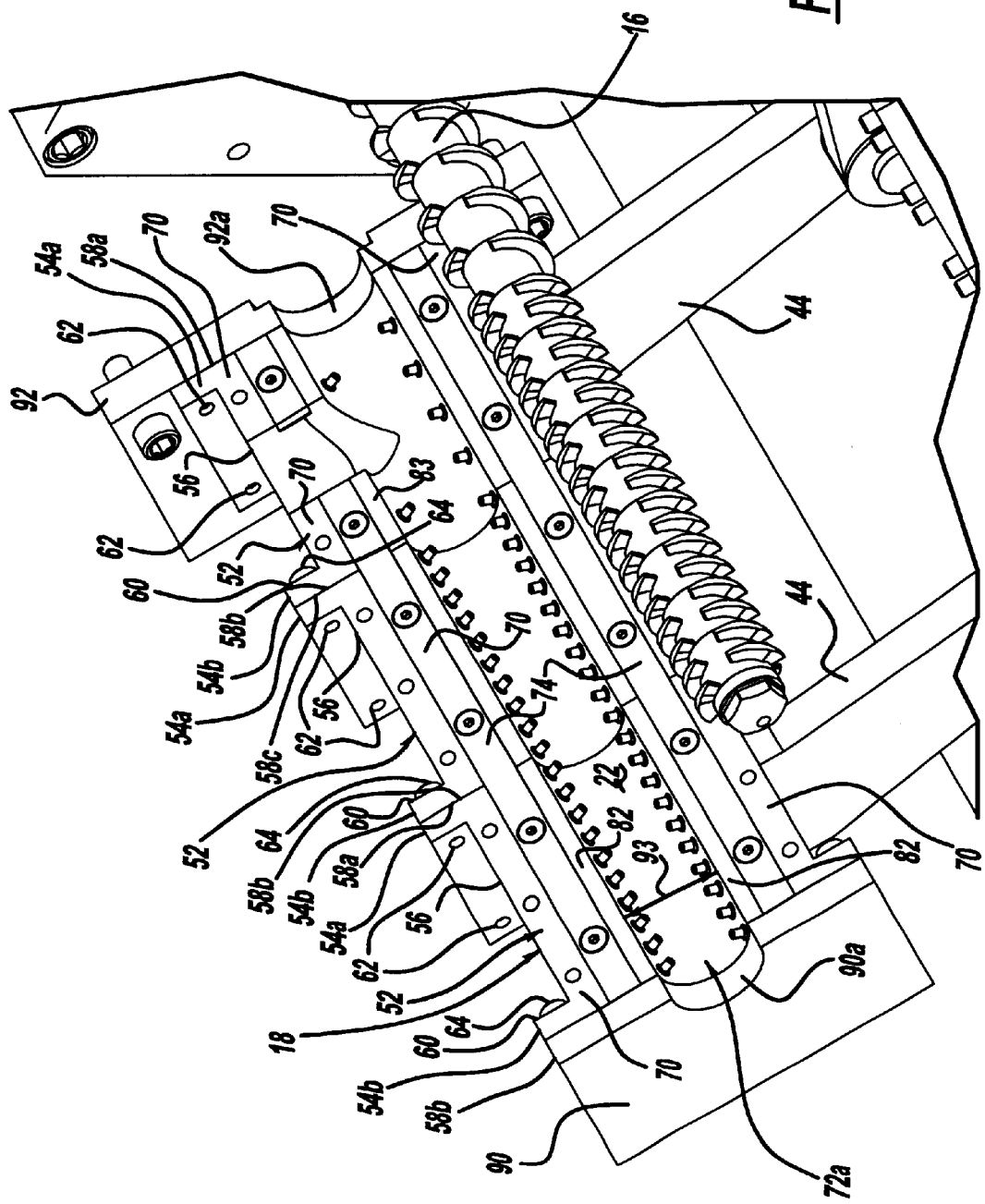
FIG. 3 is an enlarged perspective view of the preferred embodiment of a housing and liner of the kneader shown in FIG. 1.

FIG. 3 illustrates the first housing section 18 in greater detail. Only the first housing section 18 is described herein as the second housing section 20 is of similar shape and design. As shown in FIG. 3, the first housing section 18 is formed of a plurality of interconnected individual barrel members 52. Each of the barrel members 52 includes a first and a second flange 54a, 54b. The first and second flanges 54a, 54b extend outwardly from the outer surface 56 of the barrel member 52. The first flange 54a is adjacent a first end 58a and the second flange 54b is adjacent a second end 58b of the barrel member 52. The first flange 54a contains a plurality of threaded bores 62 and the second flange 54b includes a plurality of through bores 60. Accordingly, respective adjacent barrel members 52 are connected by inserting a threaded fastener 64 through the through bore 60 and into the threaded bore 62 and correspondingly tightening the threaded fastener 64. The barrel members 52 also include a plurality of passageways 66 (see FIG. 4). The passageways 66 contain a cooling fluid that it is circulated through the passageways 66 to cool the housing 12 depending upon the particular requirements of the kneader 10. Additionally, resistance heating elements 57 are attached to the barrel members 52 as is known in the art to vary the temperature of the barrel members 52. In the preferred embodiment, each of the barrel members 52 can be individually cooled or heated depending upon the particular temperature profile required in the housing 12.

Each barrel member 52 further includes a semi-cylindrical interior surface 68 forming the semi-cylindrical cavity of the preferred embodiment. The barrel members 52 also include a mating surface 70. The mating surface 70 extends outward from each edge or side 71 of the interior surface 68 of the cavity 22 to the top and bottom edges 53a, 53b of the barrel members 52. It should be understood that when the first housing section 18 and second housing section 20 are placed in a closed position, the mating surfaces 70 of the individual barrel members 52 contact or mate with one another. While shown herein as a flat or planar surface, the mating surfaces 70 may take different shapes provided the mating surfaces 70 of the barrel members 52 of the respective first and second housing sections 18, 20 are complementary and operate to seal against one another.

Figure 4:
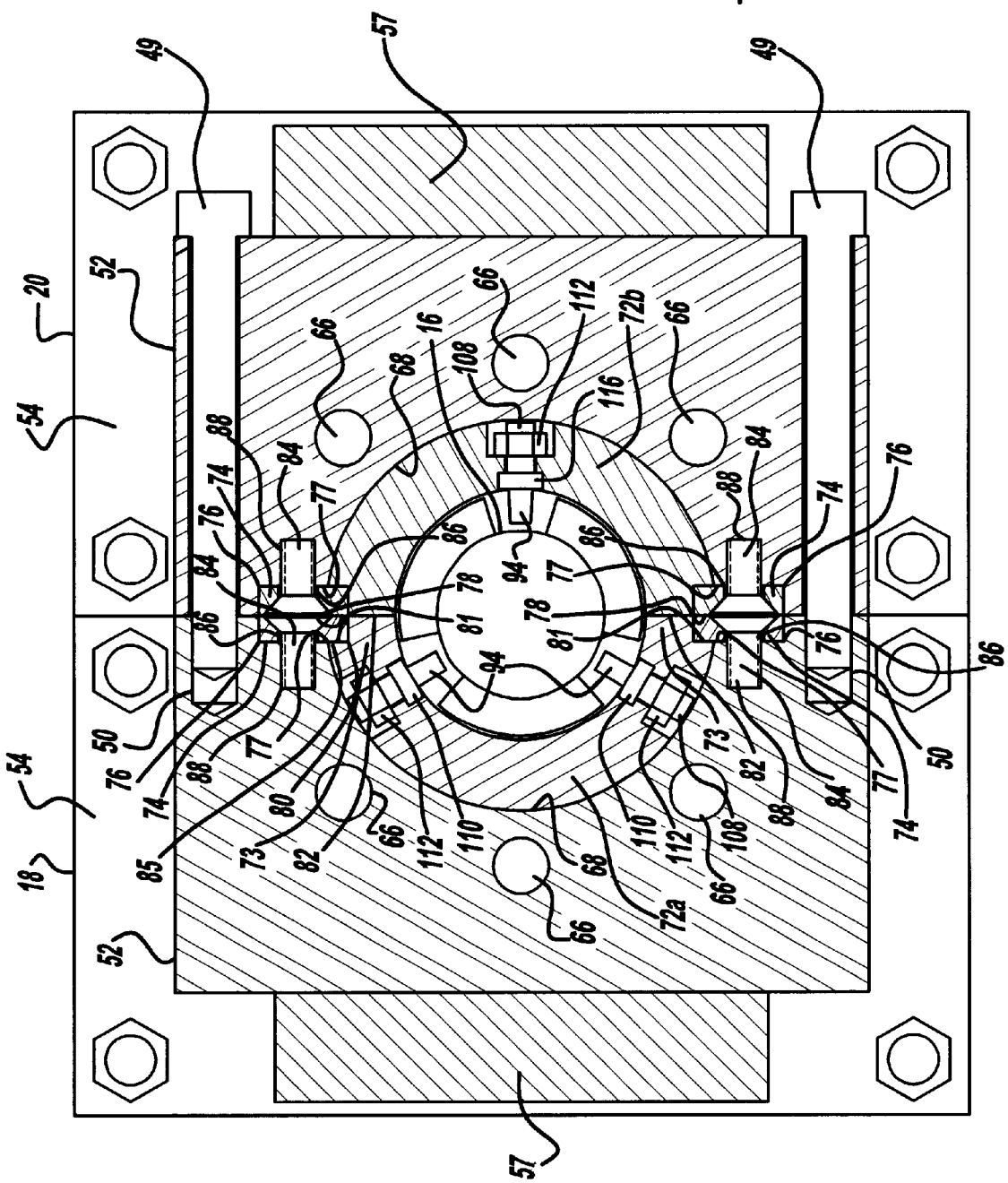
FIG. 4 is a cross-sectional view of the kneader of FIG. 1 with the housing shown in a closed position.
Figure 5:
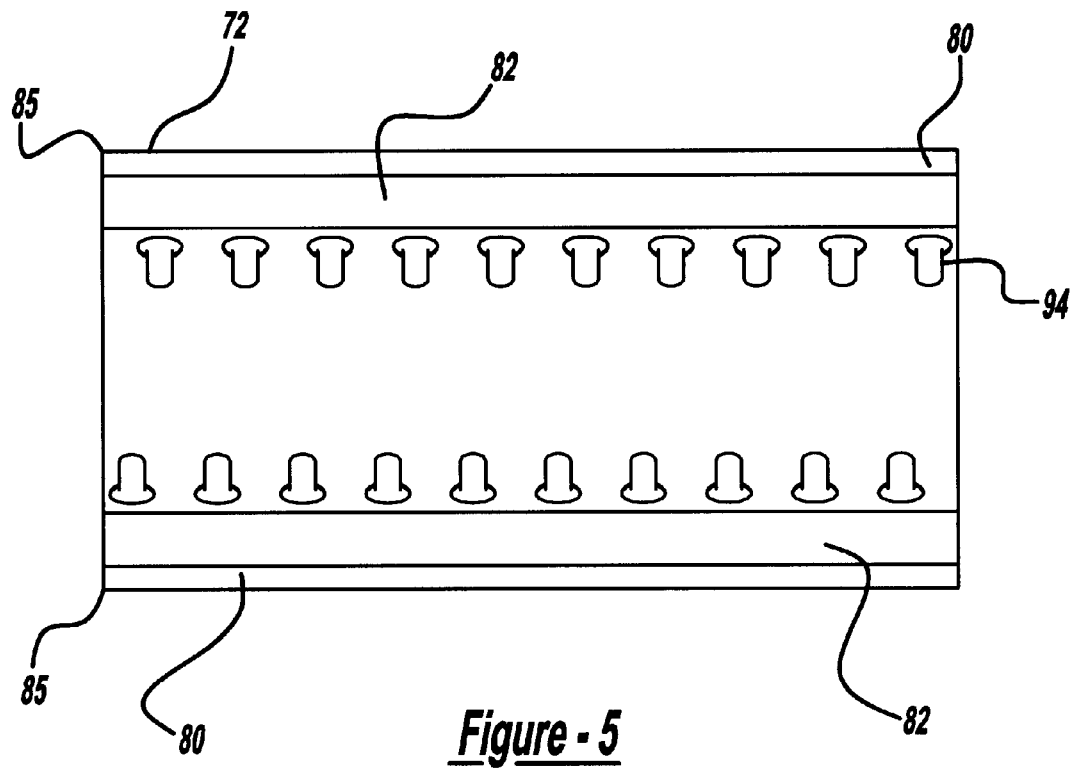
FIG. 5 is a front view of a liner of the kneader shown in FIG. 1.
Figure 6:
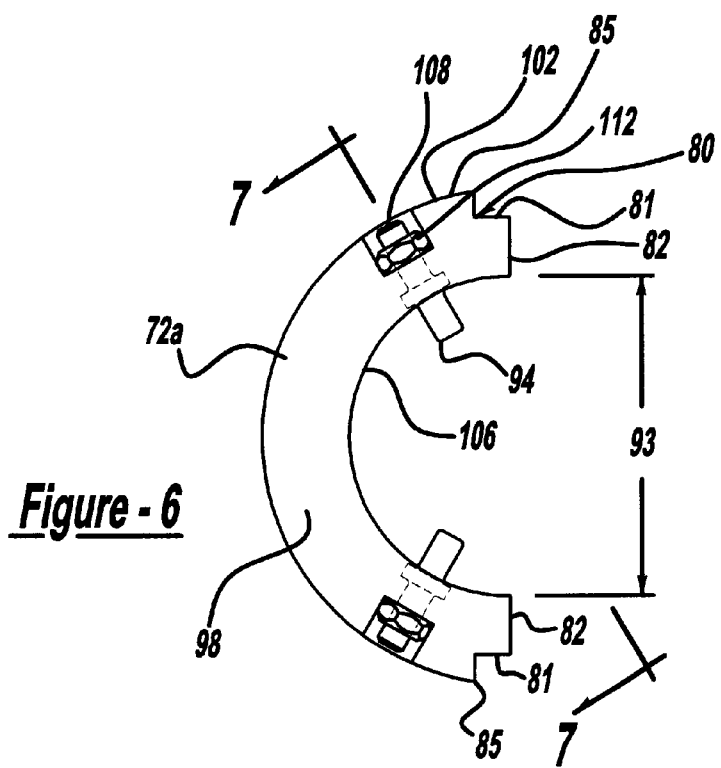
FIG. 6 is a side view of a liner of the kneader shown in FIG. 1.
Figure 7:
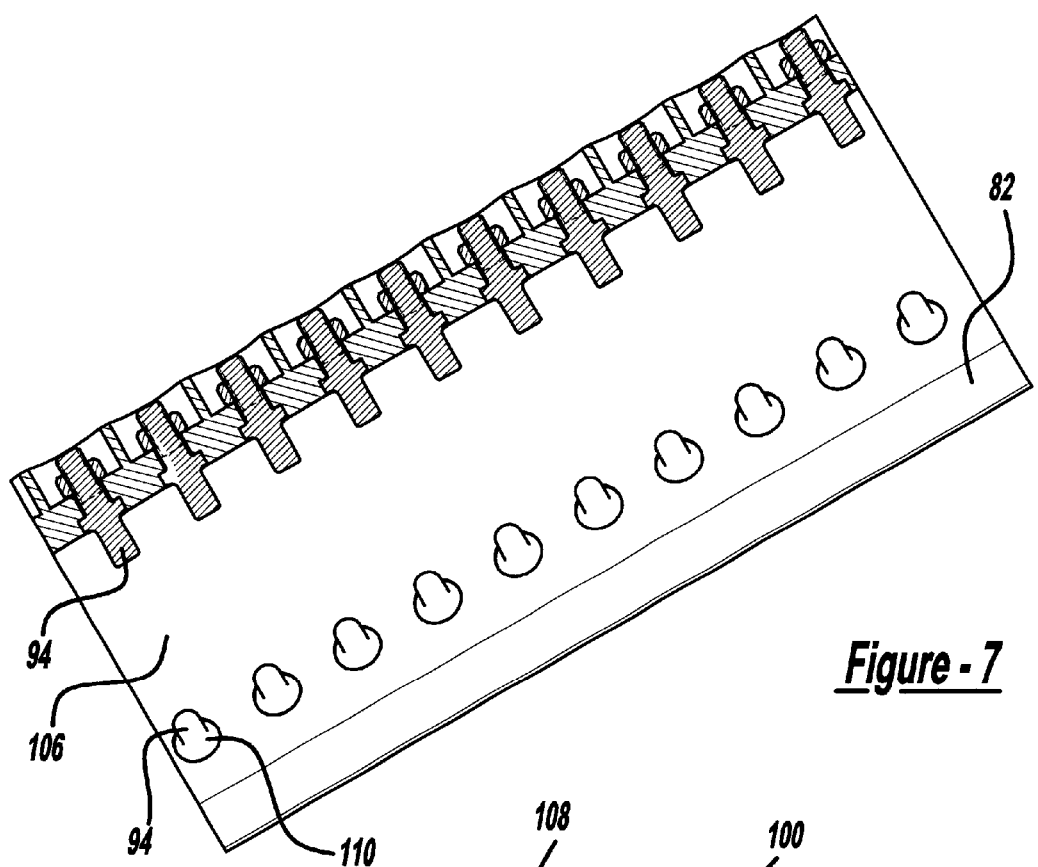
FIG. 7 is a cross-sectional view of the liner of FIG. 6 taken along lines 7—7 of FIG. 6.
Figure 8:
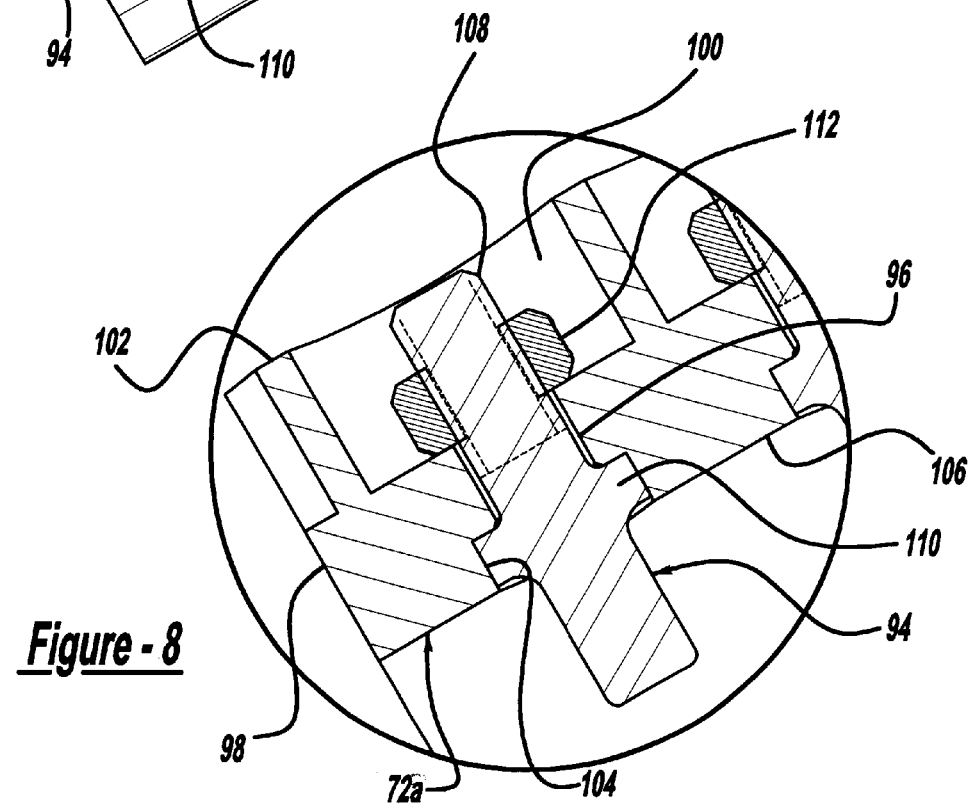
FIG. 8 is an enlarged view of the liner of FIG. 6 taken in the circle 8 of FIG. 7.

Turning now to the interior of the mixing chamber 14, as shown in FIGS. 2–4, a liner 72 is positioned within and releasably secured within the mixing chamber 14. In the preferred embodiment, the liner 72 is formed of first and second liner sections 72a, 72b. Each liner section 72a, 72b is formed as a semi-cylindrical sleeve or half shell that corresponds to the semi-cylindrical interior surface 68 of the barrel members 52. Like the first and second housing sections 18, 20, the liner sections 72a, 72b have upper and lower liner mating surfaces 82 in the upper and lower ends 73 thereof. Again, only the first liner section 72a connected to the first housing section 18 is described, as the second liner section 72b is similar in design and retained on the second housing section 20 in a similar manner.

As illustrated in FIG. 4, the first liner section 72b is retained within the cavity 22 by a liner retainers 74. As shown in FIGS. 1–3, the liner sections 72a, 72b are each retained with their corresponding housing section 18, 20 when the housing 12 is opened. The liner retainers 74 are placed in notches 76 located at each edge 69 of the cavity 22. The notches 76 form recesses 77 in the mating surface 70 that are adjacent the cavity 22. The depth of the recesses corresponds to the thickness of the liner retainers 74 such that the outer surface 78 of the liner retainer 74 is flush with the mating surface 70 of the barrel members 52.

Correspondingly, the first liner section 72a has notches 80 in the outer edges 85 of the upper and lower mating surfaces 82. These notches 80 form recesses 81 in the mating surfaces 82 of the liner sections 72a, 72b. The depth of the recesses 81 corresponds to the thickness of the liner retainer 74 such that the outer surface 78 of the liner retainer 74 is flush with the mating surface 82 of the first liner section 72a. The liner retainer 74 is secured to the barrel members 52 through a plurality of threaded fasteners 84. The threaded fasteners 84 extend through apertures 86 in the liner retainer 74 and are threadably received in threaded bores 88 in the barrel members 52. As illustrated in FIGS. 3–4, the liner retainers 74 secure the upper and lower ends 73 of the first liner section 72a to the barrel members 52.

While shown herein as a continuous strip extending the entire length of the first housing section 18, the liner retainer 74 may also be formed of individual sections corresponding to the length of the individual barrel members 52. Finally, FIG. 3 shows that the first liner section 72a is retained or prevented from moving axially, i.e., in the direction of reciprocation of the kneader screw 16, by front and rear stop plates 90, 92. As shown, the front and rear stop plates 90, 92 have apertures 90a, 92a therein corresponding in size to the inner diameter 93 of the mixing chamber 14 formed by the semi-cylindrical shape of the respective first and second liner sections 72a, 72b. Accordingly, the first and second liner sections 72a, 72b are held in place at their respective upper and lower ends 73 by the liner retainers 74, and at the front and rear of the second housing section 20 by front and rear stop plates 90, 92.

Turning now to FIGS. 5–8, there is shown a plurality of kneader pins 94 attached to the first liner section 72a. Each liner section 72a, 72b has a plurality of kneader pins 94 secured therein, and due to the similarity of the liner sections 72a, 72b, only the first liner section 72a will be discussed. The first liner section 72b has a plurality of holes 96 extending through the liner wall 98. As set forth in greater detail in FIG. 8, each hole 96 includes a countersunk portion 100 on the outer surface 102 of the first liner section 72a and a socket 104 extending inwardly from an inner surface 106 of the first liner section 72a. The kneader pin 94 includes a threaded end 108, and a shoulder portion 110. The outer diameter of the threaded end 108 is less that the inner diameter of the hole 96 and correspondingly, the threaded end 108 extends through the hole 96 in the liner wall 98 until the shoulder portion 110 of the kneader pin 94 is seated in the socket 104. A nut 112 engages the threaded end 108 and when tightened secures the kneader pin 94 to the first liner section 72a. The overall length of the threaded end 108 is such that it does not extend past the outer surface 102 of the first liner section 72a.

Figure 9:
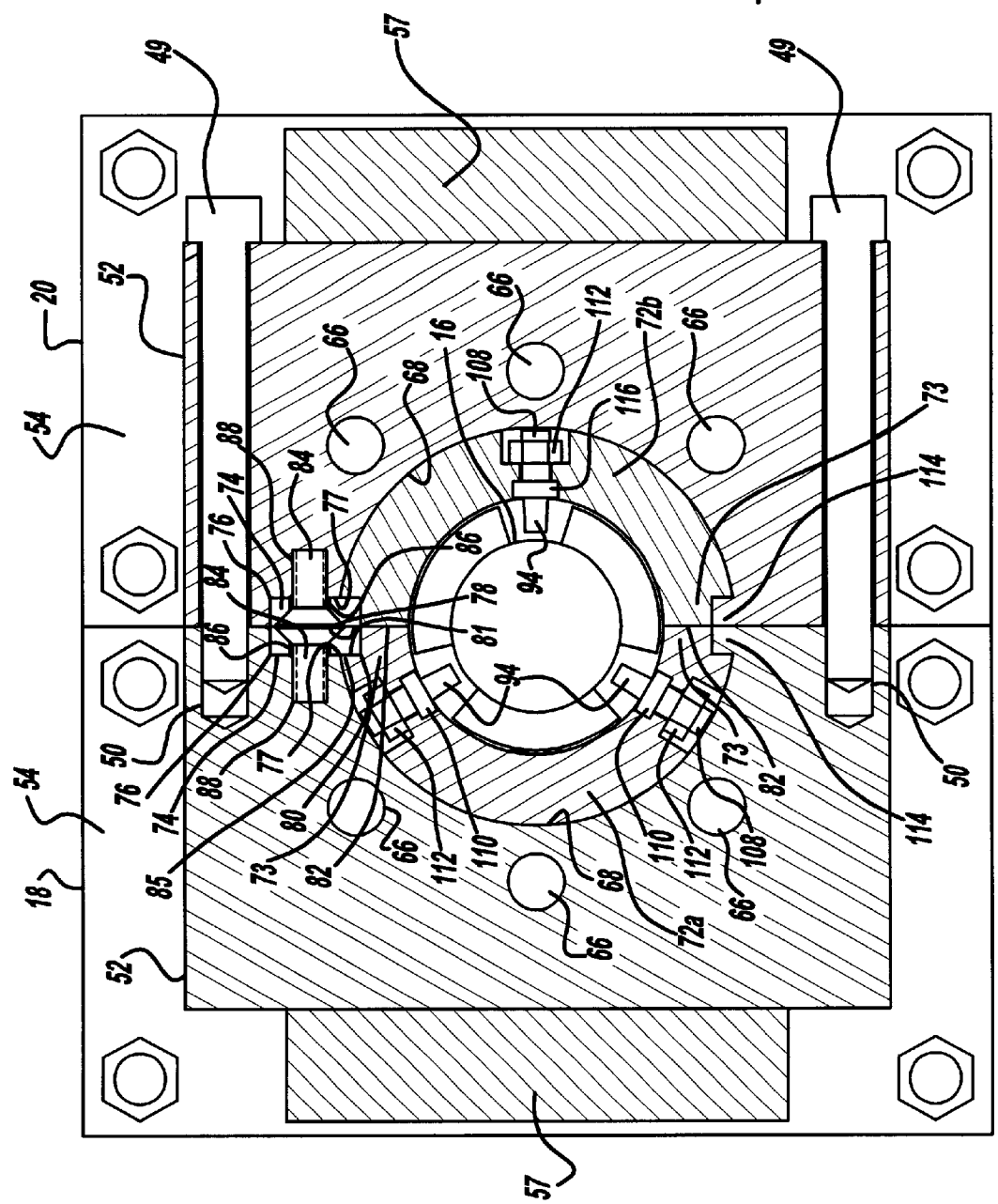
FIG. 9 is a cross-sectional view of the kneader of FIG. 1 according to a first alternative embodiment with the housing shown in a closed position.

Turning now to FIG. 9, there is shown a first alternative embodiment wherein the retainer 74 used to secure the bottom portion 73 of each of the liner sections is formed as an integral retaining lip 114 with each of the first and second housings. Accordingly, the liner sections 72a, 72b slide into the cavity 22 until they engage the integral retaining lip 114, after which a separate liner retainer 74 is used at the top portion to secure the top portion 73 of the liner section 72a, 72b to the housing section 18, 20.

Figure 10:
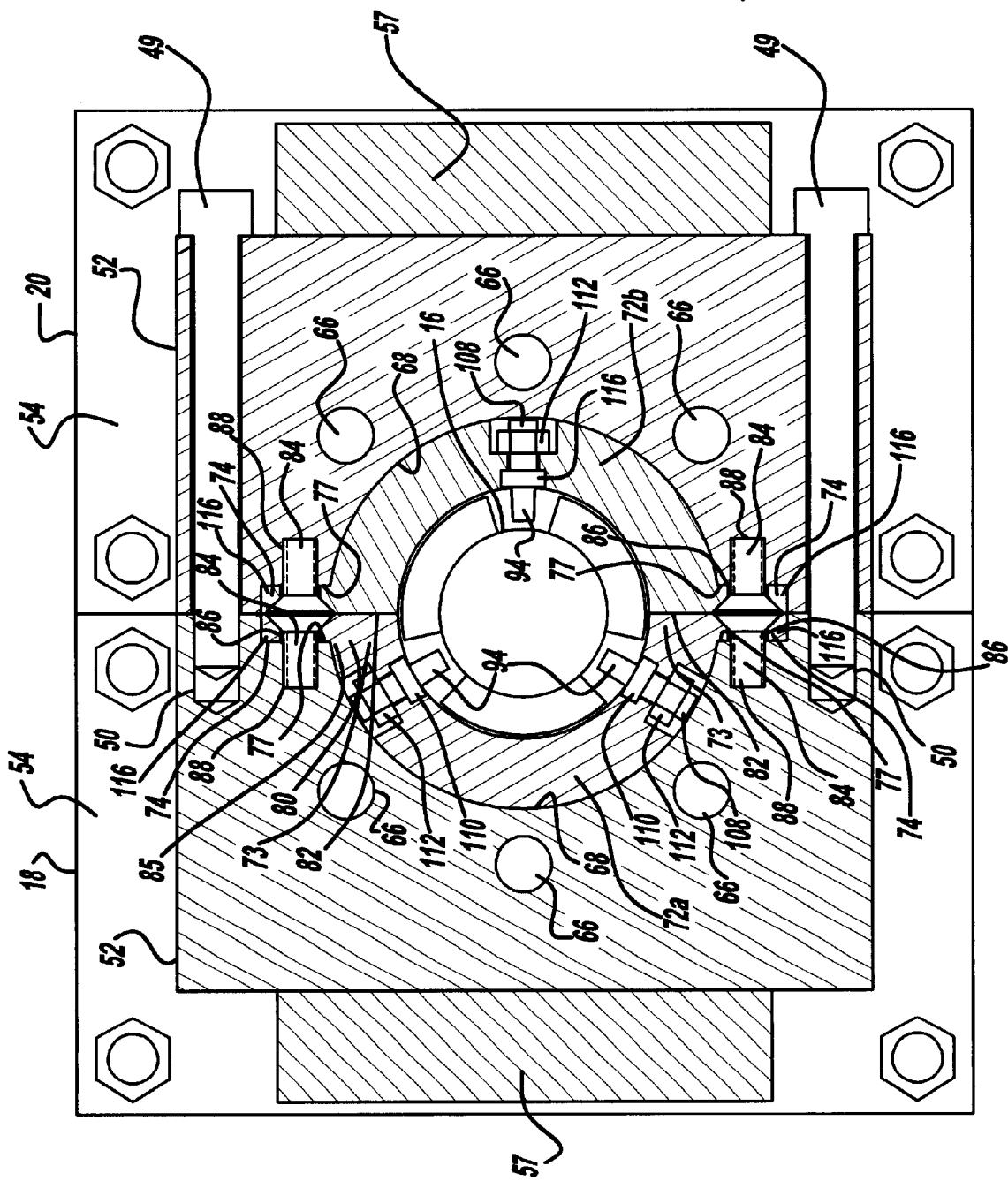
FIG. 10 is a cross-sectional view of the kneader of FIG. 1 according to a second alternative embodiment with the housing shown in a closed position.

Turning now to FIG. 10, there is shown a second alternative embodiment wherein the retainer 74 used to secure the liner sections 72a, 72b is formed integral with the liner sections 72a, 72b. Accordingly, the liner sections 72a, 72b include integral tab portions 116 extending outward into the recesses 77 on the housing section. As with the previous embodiments, threaded fasteners 84 extend through apertures 88 in the tab portions 116 to secure each liner section 72a, 72b to a corresponding housing section 18, 20.

Figure 11:
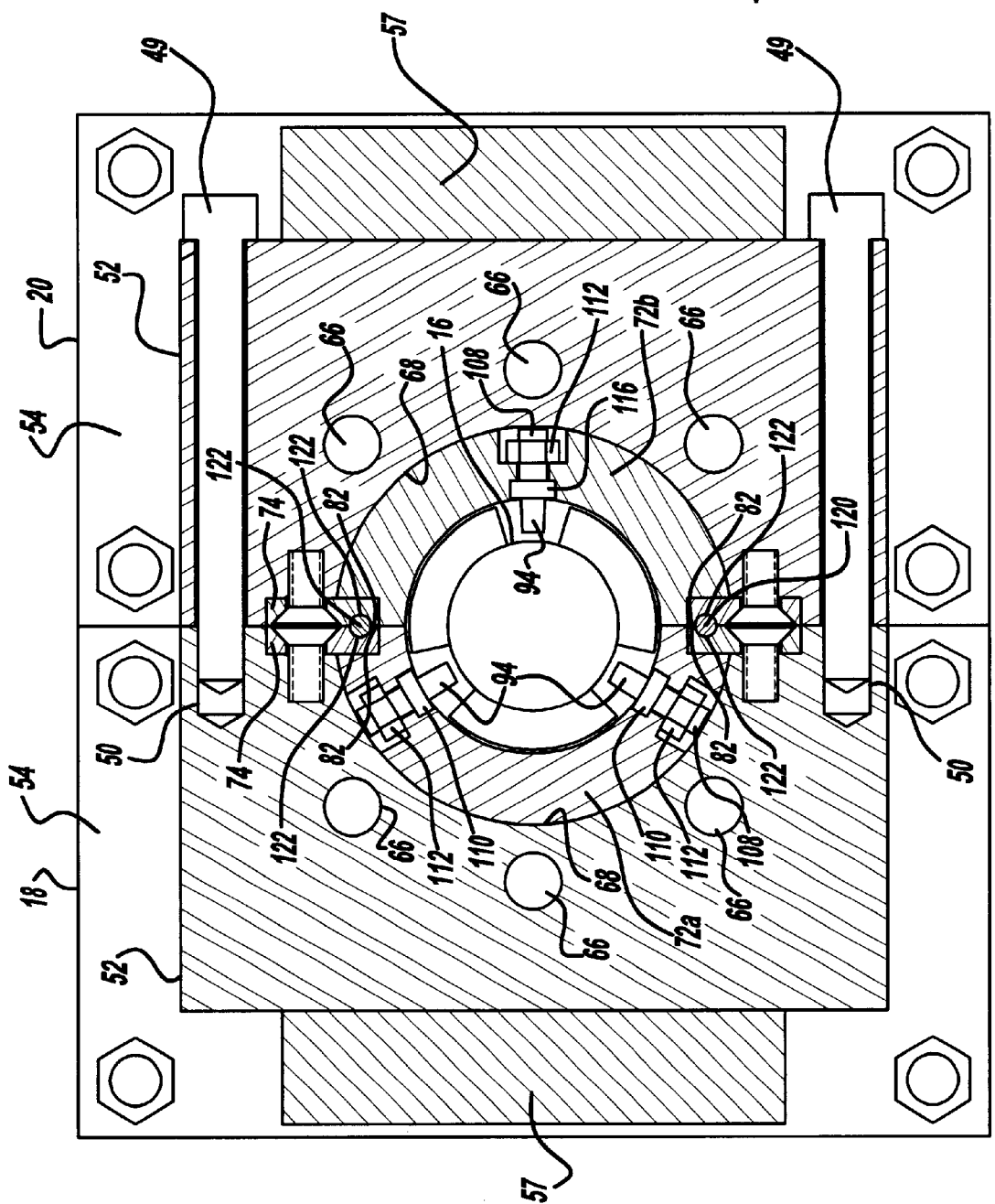
FIG. 11 is a cross-sectional view of the kneader of FIG. 1 according to a third alternative embodiment with the housing shown in a closed position.

Turning now to FIG. 11, there is shown a third alternative embodiment wherein a sealing means 120 is shown disposed between opposing mating surfaces 82 of the respective liner retainer 74 used to secure respective liner sections 72a, 72b to the housing sections 18,20. As shown, the sealing means 120 includes a o-ring disposed is an o-ring groove or channel 122 formed in each of the mating surfaces 82 of opposed liner retainers 74. While both mating surfaces 82 are shown with an o-ring groove 122, this is for illustration purposes only and an o-ring can be placed in a single groove or channel located in one of the opposed mating surfaces 82 and seal against the opposite opposed mating surface 82 without a groove or channel 82 therein. Also, other sealing arrangements can be used such as metal or fiber gaskets and metal to metal contact surfaces such as a boss and groove type seal, i.e., a boss on one surface engages a groove located on an opposite surface.

Accordingly, the kneading pins 94 can be attached to the respective first and second liner sections 72a, 72b in any desired pattern or number according to the experience of a person skilled in the art. Since the kneading pins 94 are attached to the first and second liner sections 72a, 72b prior to the liner sections being attached to the first and second housing sections 18, 20, replacement of the kneading pins 94 is greatly simplified—the operator simply replaces individual liner sections. Once the liner sections are removed, only the worn kneading pins 94 on the removed liner section need be replaced prior to reinstallation of the liner sections. Finally the retaining means disclosed herein holds the liners to the respective housing sections when the housing sections are separated. Accordingly, the present invention allows for the quick and easy replacement of both the liner sections and kneading pins resulting in less downtime of the kneader.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. An apparatus for kneading or mixing materials comprising:
   a housing, said housing including first and second housing sections, each of said housing sections having a mating surface and a cavity formed on said mating surface, said cavity defining first and second edges at the cavity and mating surface interface, each of said first and second housing sections further having recessed portions located at said first and second edges on each of said first and second housing sections;
   a liner, said liner including first and second liner sections, each of said first and second liner sections having upper and lower ends along with front and rear axial ends, said upper and lower ends having recessed portions in the outer edges thereof, said first and second liner sections corresponding to and disposed within said cavities in said first and second housing sections such that said recessed portions of said first and second liner sections are proximate said recessed portions of said first and second housing sections;
   a plurality of liner retainers, said liner retainers extending along a portion of and in the direction of an axis extending between said front and rear axial ends and disposed within said recessed portions of said first and second housing sections and said recessed portions of said first and second liner sections; and
   said liner retainers received in said recessed portions of said first and second housing sections and fastened to said first and second housing sections to secure said liner retainers to said first and second housing sections and correspondingly secure said first and second liner sections to said first and second housing sections.

2. An apparatus for kneading or mixing materials as set forth in claim 1 including a plurality of kneader pins secured to said first and second liner sections.

3. An apparatus for kneading or mixing materials as set forth in claim 2 wherein each of said first and second liner sections include a liner wall;
   a plurality of bores extending through said liner wall, each of said bores including a counterbored portion extending inwardly from an outer surface of said liner wall;
   said kneader pins including a threaded portion, said threaded portion extending through said bores and into said counterbored portion; and
   a nut engaging said threaded portion, said nut having a diameter less than the diameter of the counterbored portion such that the nut fits within the counterbored portion and below the outer surface of said liner wall.

4. An apparatus for kneading or mixing materials as set forth in claim 3 wherein each of said kneader pins includes a shoulder portion; and
   said liner wall including a socket extending inwardly from an inner surface of said liner wall, said shoulder portion disposed within said socket.

5. An apparatus for kneading or mixing materials as set forth in claim 1 wherein said first and second liner sections corresponding to and disposed within said cavities in said first and second housing sections positioned such that said recessed portions of said first and second liner sections are adjacent said recessed portions on said first and second housing sections.

6. An apparatus for kneading or mixing materials as set forth in claim 1 including a plurality of fasteners engaging said liner retainers and securing said liner retainers to said first and second housing sections.

7. An apparatus for kneading or mixing materials as set forth in claim 6 wherein said plurality of fasteners includes a plurality of threaded fasteners extending through apertures in said liner retainers and threadably received in corresponding threaded bores located on each of said first and second liner sections.

8. An apparatus for kneading or mixing materials comprising:
   a housing, said housing including first and second housing sections, each of said first and second housing sections having a cavity formed therein, said cavity extending axially within said first and second housing sections along an axis extending between a front end of said housing and a rear end of said housing, each of said first and second housing sections further including a mating surface, said mating surface having an axially extending recess formed therein adjacent said cavity;
   a liner, said liner including first and second liner sections corresponding to said first and second housing sections, each of said first and second liner sections having upper and lower ends along with front and rear axial ends wherein said first and second liner sections are disposed within said cavities in said first and second housing sections such that said liner extends axially within said housing; and a plurality of liner retainers, wherein said liner retainers are disposed in and extend along a portion of the axially extending recess of said mating surface of said first and second housing sections, said liner retainers engaging said first an-d second liner sections and secured within said recess to correspondingly secure said first and second liner sections to said first and second housing sections.

9. An apparatus for kneading or mixing materials as set forth in claim 8 wherein said liner retainers are formed integral with said liner.

10. An apparatus for kneading or mixing materials as set forth in claim 8 wherein said liner retainers are located in a recessed portion of said first and second liner sections.

11. An apparatus as set forth in claim 8 wherein said liner retainers include a sealing member position between respective liner retainers.

12. An apparatus as set forth in claim 8 wherein said liner retainers contact said lower ends of said liner sections.

13. An apparatus for kneading or mixing materials comprising:

a housing, said housing including first and second housing sections, each of said housing sections having a mating surface and a cavity formed on said mating surface, said cavity defining first and second edges at the cavity and mating surface interface, each of said first and second housing sections further having recessed portions located at said first and second edges on each of said first and second housing sections;

a liner, said liner including first and second liner sections, each of said first and second liner sections having upper and lower ends, said upper and lower ends having recessed portions in the outer edges thereof, said first and second liner sections corresponding to and disposed within said cavities in said first and second housing sections such that said recessed portions of said first and second liner sections are proximate said recessed portions of said first and second housing sections, a plurality of kneader pins secured to said first and second liner sections;

a plurality of liner retainers, said liner retainers disposed within said recessed portions of said first and second housing sections and said recessed portions of said first and second liner sections; and said liner retainers received in said recessed portions of said first and second housing sections and fastened to said first and second housing sections to secure said liner retainers to said first and second housing sections and correspondingly secure said first and second liner sections to said first and second housing section;

each of said first and second liner sections include a liner wall;

a plurality of bores extending through said liner wall, each of said bores including a counterbored portion extending inwardly from an outer surface of said liner wall;

said kneader pins including a threaded portion, said threaded portion extending through said bores and into said counterbored portion; and a nut engaging said threaded portion, said nut having a diameter less than the diameter of the counterbored portion such that the nut fits within the counterbored portion and below the outer surface of said liner wall.

14. An apparatus for kneading or mixing materials as set forth in claim 13 wherein each of said kneader pins includes a shoulder portion; and said liner wall including a socket extending inwardly from an inner surface of said liner wall, said shoulder portion disposed within said socket.

* * * * *